US012475272B2

(12) United States Patent
Caracas

(10) Patent No.: US 12,475,272 B2
(45) Date of Patent: Nov. 18, 2025

(54) COMPUTER-IMPLEMENTED VERIFICATION OF POST-TENSIONING SYSTEMS

(71) Applicant: Impacto Protensão LTDA, Fortaleza (BR)

(72) Inventor: Joaquim Caracas, Ceara (BR)

(73) Assignee: IMPACTO PROTENSÃO LTD, Fortaleza (BR)

( * ) Notice: Subject to any disclaimer, the term of this patent is extended or adjusted under 35 U.S.C. 154(b) by 1333 days.

(21) Appl. No.: 16/905,651

(22) Filed: Jun. 18, 2020

(65) Prior Publication Data

US 2021/0097213 A1  Apr. 1, 2021

(30) Foreign Application Priority Data

Sep. 26, 2019 (BR) .......................... 10 2019 0201215

(51) Int. Cl.
*G06F 30/13* (2020.01)
*E04C 5/00* (2006.01)
*G06K 7/14* (2006.01)
*G06F 113/16* (2020.01)

(52) U.S. Cl.
CPC ................ *G06F 30/13* (2020.01); *E04C 5/00* (2013.01); *G06K 7/1404* (2013.01); *G06F 2113/16* (2020.01)

(58) Field of Classification Search
CPC .............. E04C 5/00; E04C 5/16; E04C 5/163; E04C 5/168; E04C 5/18; E04C 5/20; E04C 5/201; E04C 5/206; G06F 30/13; G06F 30/18; G06F 2113/16; G06K 7/1404

USPC ........................... 52/677, 678, 687, 688, 689
See application file for complete search history.

(56) References Cited

U.S. PATENT DOCUMENTS

| | | | | | |
|---|---|---|---|---|---|
| 944,731 | A | * | 12/1909 | Gold | F16L 3/2235 248/68.1 |
| 2,345,976 | A | * | 4/1944 | Hillberg | E04F 21/05 248/157 |
| 2,634,603 | A | * | 4/1953 | Byars | E01C 11/18 404/136 |
| 3,006,115 | A | * | 10/1961 | Hillberg | E04F 21/05 52/678 |
| 3,015,912 | A | * | 1/1962 | Fistedis | E02D 27/44 52/223.6 |
| 3,050,283 | A | * | 8/1962 | Tumey | B28B 23/04 425/111 |

(Continued)

*Primary Examiner* — James M Ference
(74) *Attorney, Agent, or Firm* — MUNCY, GEISSLER, OLDS & LOWE, P.C.

(57) ABSTRACT

Methods and apparatus for improving accuracy in installing and verifying post-tensioning cables are described herein. In an embodiment, a computing system receives a computer-aided design drawing of a structure with post-tensioning cables and uses the computer-aided design drawing to populate a base spreadsheet with data extracted from the drawing. The computing system then determines a plurality of locations on a particular post-tensioning cable to place labels, causes display of an indication of the plurality of locations, and causes printing of the labels. When a scan of a label is received, the computing system retrieves the extracted data, requests input relating to the label, and compares the input to the extracted data. Any discrepancies are then displayed through a display device.

4 Claims, 16 Drawing Sheets

(56) References Cited

U.S. PATENT DOCUMENTS

| | | | | |
|---|---|---|---|---|
| 3,105,423 A * | 10/1963 | Reiland | E01C 11/18 | 52/684 |
| 3,145,502 A * | 8/1964 | Rubenstein | E04C 2/26 | 52/223.7 |
| 3,286,419 A * | 11/1966 | Eriksson | E04C 5/08 | 52/223.13 |
| 3,399,434 A * | 9/1968 | Kelly | F16B 7/22 | 425/173 |
| 3,440,792 A * | 4/1969 | Schmidgall | E04C 5/168 | 138/175 |
| 3,585,773 A * | 6/1971 | Seppala | E04C 5/18 | 248/157 |
| 3,693,310 A * | 9/1972 | Middleton | E04C 5/168 | 52/685 |
| 3,937,607 A * | 2/1976 | Rodormer | B28B 23/043 | 52/223.13 |
| 4,055,927 A * | 11/1977 | Tamaro | E02D 5/20 | 264/35 |
| 4,060,954 A * | 12/1977 | Liuzza | E04C 5/168 | 52/309.1 |
| 4,325,533 A * | 4/1982 | Tiletschke | E04C 5/00 | 249/188 |
| 4,483,119 A * | 11/1984 | Hernandez | E04C 5/20 | 52/689 |
| 4,498,270 A * | 2/1985 | Ilukowicz | E04C 5/20 | 52/685 |
| 4,562,679 A * | 1/1986 | Pattiselanno | E04G 21/125 | 52/378 |
| 4,644,727 A * | 2/1987 | Hanson | E04C 5/20 | 52/678 |
| 4,796,851 A * | 1/1989 | Brechbuehler | E04G 21/125 | 249/188 |
| 4,835,933 A * | 6/1989 | Yung | E04C 5/168 | 52/685 |
| 4,878,327 A * | 11/1989 | Nutzel | E04C 5/08 | 52/223.13 |
| 5,400,562 A * | 3/1995 | Bahr | E04C 5/201 | 52/678 |
| 5,535,562 A * | 7/1996 | Huang | E04C 5/12 | 52/223.13 |
| 5,555,693 A * | 9/1996 | Sorkin | E04C 5/20 | 52/687 |
| 5,729,949 A * | 3/1998 | Hartzheim | E04C 5/206 | 52/682 |
| 5,775,648 A * | 7/1998 | Metzger | F16L 3/22 | 248/68.1 |
| 5,791,095 A * | 8/1998 | Sorkin | E04C 5/20 | 52/105 |
| 5,819,493 A * | 10/1998 | LeMoignan | E04C 5/206 | 404/136 |
| 5,893,252 A * | 4/1999 | Hardy, Jr. | E04C 5/168 | 52/685 |
| 5,897,102 A * | 4/1999 | Sorkin | E04C 5/12 | 52/223.13 |
| 5,906,076 A * | 5/1999 | Mc Manus | E04G 11/48 | 52/354 |
| 6,098,356 A * | 8/2000 | Sorkin | E04C 5/12 | 52/223.13 |
| 6,161,360 A * | 12/2000 | Smith | E04C 5/168 | 52/165 |
| 6,695,208 B1 * | 2/2004 | Chew | B28B 23/0031 | 235/487 |
| 6,761,317 B1 * | 7/2004 | Knowles | G06K 7/10603 | 235/487 |
| 7,108,453 B2 * | 9/2006 | Harris | E04C 5/168 | 404/136 |
| 7,237,367 B1 * | 7/2007 | Sorkin | E04C 5/20 | 52/687 |
| 7,322,158 B1 * | 1/2008 | Sorkin | E04C 5/168 | 52/685 |
| 7,451,580 B2 * | 11/2008 | Kelly | E04C 5/20 | D25/199 |
| 7,461,491 B1 * | 12/2008 | Sorkin | E04C 5/20 | 52/685 |
| 7,475,446 B1 * | 1/2009 | He | E01D 2/04 | 52/223.7 |
| 7,497,059 B2 * | 3/2009 | Bennett | E04C 5/206 | 52/719 |
| 7,845,136 B1 * | 12/2010 | Sorkin | E04C 5/20 | 52/687 |
| 7,969,295 B2 * | 6/2011 | Colvero | G01V 15/00 | 324/67 |
| 8,069,624 B1 * | 12/2011 | Sorkin | E04C 5/12 | 403/374.1 |
| 8,266,751 B2 * | 9/2012 | He | E01D 21/00 | 14/78 |
| 8,312,687 B2 * | 11/2012 | Yee | E04C 5/168 | 404/136 |
| 8,863,468 B1 * | 10/2014 | Perry | G06Q 90/00 | 52/686 |
| 8,919,057 B1 * | 12/2014 | Dupray | E04B 5/36 | 52/223.6 |
| 9,235,823 B2 * | 1/2016 | Rushing | G06Q 50/06 | |
| 9,510,150 B2 * | 11/2016 | Kahle | G01S 19/14 | |
| 9,666,090 B2 * | 5/2017 | Kahle | G09B 9/00 | |
| 9,677,690 B2 * | 6/2017 | Lalancette | F16L 3/20 | |
| 9,817,839 B2 * | 11/2017 | Kahle | G06F 16/16 | |
| 9,898,705 B2 * | 2/2018 | Kahle | G06Q 10/063114 | |
| 2002/0083659 A1 * | 7/2002 | Sorkin | E04C 5/08 | 52/231 |
| 2003/0233798 A1 * | 12/2003 | Berkey | E04C 5/08 | 52/223.6 |
| 2004/0031214 A1 * | 2/2004 | Fong | G01C 15/04 | 52/103 |
| 2004/0098942 A1 * | 5/2004 | Lee | E04C 5/20 | 52/686 |
| 2004/0261352 A1 * | 12/2004 | Bennett | E04C 5/20 | 52/698 |
| 2005/0005564 A1 * | 1/2005 | Bennett | E04C 5/168 | 52/677 |
| 2005/0102951 A1 * | 5/2005 | Bennett | E04C 5/206 | 52/633 |
| 2005/0144902 A1 * | 7/2005 | Gorman | E04C 5/08 | 52/782.1 |
| 2006/0026009 A1 * | 2/2006 | Luhr | G06Q 50/165 | 705/315 |
| 2006/0032179 A1 * | 2/2006 | Lee | E04C 5/20 | 52/686 |
| 2006/0059804 A1 * | 3/2006 | Brown | E04C 5/0645 | 52/223.13 |
| 2006/0243808 A1 * | 11/2006 | Burlando | G06K 19/06046 | 235/487 |
| 2007/0000197 A1 * | 1/2007 | Patrick | E04B 5/29 | 52/434 |
| 2007/0157542 A1 * | 7/2007 | Peterson | E04C 5/20 | 52/677 |
| 2007/0193189 A1 * | 8/2007 | Bennett | E04C 5/168 | 52/677 |
| 2008/0028718 A1 * | 2/2008 | Erickson | E04C 5/206 | 52/687 |
| 2008/0209843 A1 * | 9/2008 | Helms | E04C 5/163 | 52/742.14 |
| 2008/0243269 A1 * | 10/2008 | Townsend | E04C 5/01 | 700/32 |
| 2009/0100784 A1 * | 4/2009 | Garza | E04C 5/205 | 52/686 |
| 2009/0193731 A1 * | 8/2009 | Fabinski | E04G 21/1841 | 52/223.13 |
| 2009/0289797 A1 * | 11/2009 | Sakama | G06K 19/041 | 340/572.8 |
| 2009/0320396 A1 * | 12/2009 | Knudsen | E04C 3/30 | 52/297 |
| 2010/0219236 A1 * | 9/2010 | Vitt | B28B 23/0031 | 235/375 |
| 2010/0277290 A1 * | 11/2010 | Knudsen | E04H 12/2269 | 264/32 |
| 2011/0041432 A1 * | 2/2011 | Colwell | H02G 3/22 | 52/220.8 |

(56) References Cited

U.S. PATENT DOCUMENTS

| | | | |
|---|---|---|---|
| 2013/0138606 A1* | 5/2013 | Kahle | G06Q 10/103 |
| | | | 707/722 |
| 2014/0125457 A1* | 5/2014 | Rushing | G06Q 50/06 |
| | | | 340/8.1 |
| 2014/0250746 A1* | 9/2014 | Adell Lopez | G09F 3/0295 |
| | | | 40/299.01 |
| 2014/0311081 A1* | 10/2014 | Parham | E04C 5/168 |
| | | | 52/677 |
| 2014/0365259 A1* | 12/2014 | Delplace | G06Q 10/063114 |
| | | | 705/7.15 |
| 2015/0075110 A1* | 3/2015 | Golledge | E04C 5/166 |
| | | | 52/741.3 |
| 2016/0123012 A1* | 5/2016 | Francies, III | E04C 5/168 |
| | | | 248/68.1 |
| 2017/0278030 A1* | 9/2017 | Pettersson | G06Q 50/08 |
| 2019/0017256 A1* | 1/2019 | Michiels | E05B 65/06 |
| 2019/0390460 A1* | 12/2019 | Verelli | E04C 5/168 |
| 2021/0097213 A1* | 4/2021 | Caracas | G06K 7/1404 |
| 2021/0108414 A1* | 4/2021 | Cross | E04C 5/168 |
| 2021/0310247 A1* | 10/2021 | Sorkin | B29C 45/14065 |

* cited by examiner

COMPUTER-IMPLEMENTED VERIFICATION OF POST-TENSIONING SYSTEMS

BENEFIT CLAIM

This application claims the benefit under 35 U.S.C. § 119(b) of Brazil application BR 10 2019 0201215, filed Sep. 26, 2019, the entire contents of which is hereby incorporated by reference as if fully set forth herein.

FIELD OF THE DISCLOSURE

The present disclosure relates to post-tensioning cables for concrete construction projects. The present disclosure additionally relates to support devices for post-tensioning cables and computer-implemented installation and verification methods for post-tensioning cables.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

Large scale construction projects often require skilled workers to read an interpret design drawings in order to ensure that the project is being constructed as intended. Early identification of errors or discrepancies between the project designs and the project execution can be vital in completing a construction project correctly and safely.

An important aspect of many construction projects is the pouring of concrete for physical structures such as buildings. Concrete structures are often used to provide support to a structure. To properly provide the needed levels of support, concrete structures may use post-tensioning cables. These cables apply tension to the concrete structure by being pulled down at various locations. Proper application of these cables prior to the pouring of concrete can be of paramount importance as improper installation can lead to cracks, deformities, or even total collapse of the structure.

Verification of proper setup of post-tensioning cables can be error prone. A skilled technician must first interpret design drawings to identify the proper locations of cables. The technician must then verify heights of the cables at various points, often using imprecise measurement means, such as rulers or measuring tape. In a construction environment, the design of the project, need for interpretation of design drawings, and difficulty in verifying values from the drawing can all lead to errors in the project.

Thus, there is a need for structures and computer-implemented methods for improving accuracy in application of post-tensioning cables in construction projects.

SUMMARY

The appended claims may serve as a summary of the disclosure.

DETAILED DESCRIPTION

Figure 1:
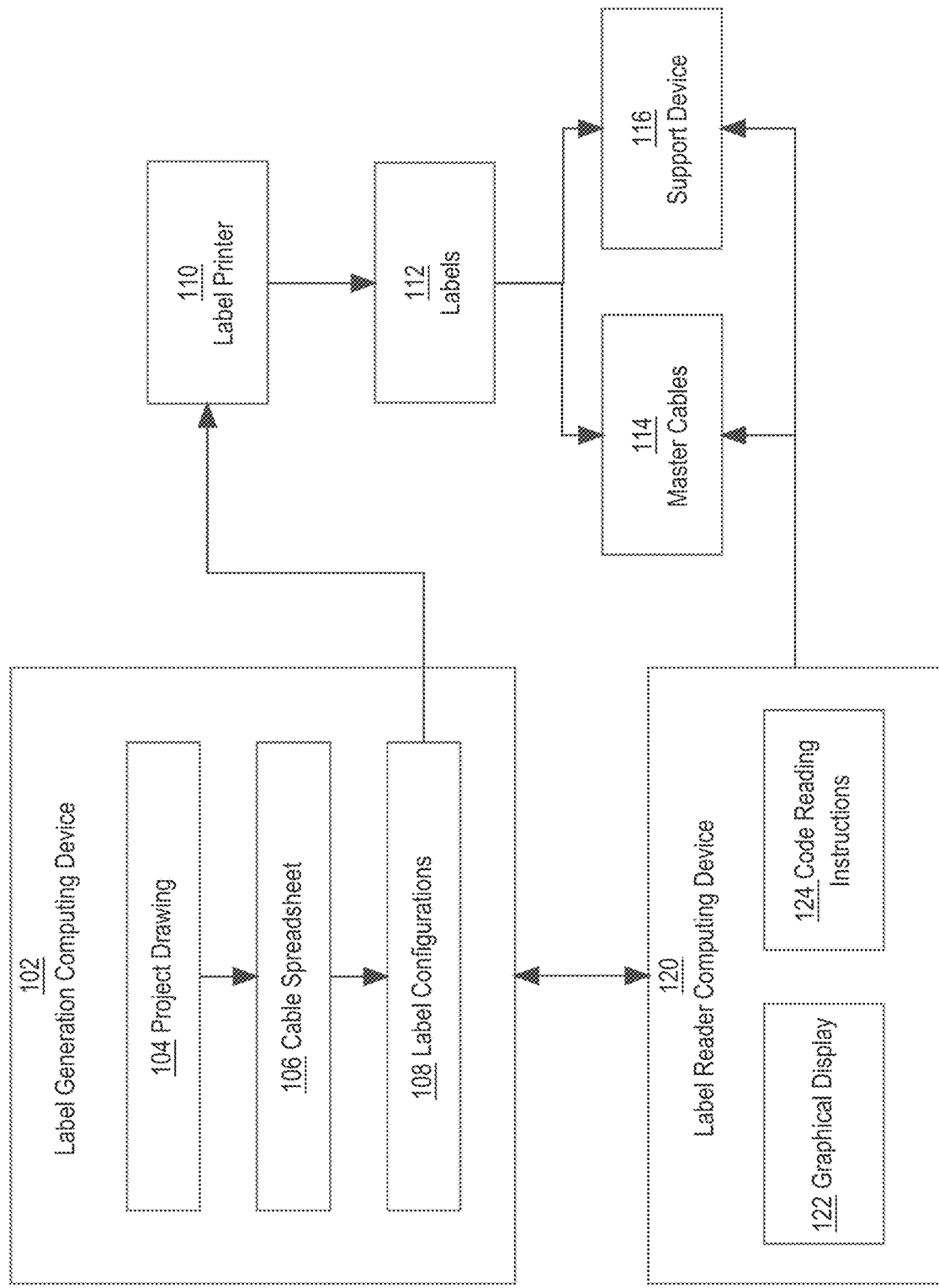
FIG. 1 depicts an example system architecture for a post-tensioning cable tracking system.

In the following description, for the purposes of explanation, numerous specific details are set forth in order to provide a thorough understanding of the present disclosure. It will be apparent, however, that the embodiments may be practiced without these specific details. In other instances, well-known items are shown in block diagram form in order to avoid unnecessarily obscuring the present disclosure.

General Overview

Systems and method for improving accuracy in application of post-tensioning cables in construction projects are described herein. In an embodiment, labels are affixed to cables and/or support devices which are then used in the construction project. In order to verify correct application, a technician may scan a label on a cable. A display device interprets a computer-readable code on the label and requests input relating to the cables. The display device verifies the input with stored data extracted from design drawings. In an embodiment, the technician further scans labels attached to support devices. The display device interprets computer-readable codes on the labels of the support devices and verifies information extracted from the design drawings based on the scan of the labels on the master cable match information extracted based on the scan of the labels on the support devices.

In an embodiment, a method comprises receiving a computer-aided drawing of a structure with post-tensioning cables. "Structure," in this context, refers to a physical structure such as a building, bridge, or any other post-tensioned concrete structure. The method further comprises using the computer aided drawing, populating a base spreadsheet with data extracted from the drawing; based on the base spreadsheet, determining a plurality of locations on a particular post-tensioning cable to place labels, each of the labels identifying, for a location of the plurality of locations corresponding to the label, a height of the particular post tensioning cable at the location; causing displaying, an indication of the plurality of locations on the particular post-tensioning cable to place the labels; causing printing of the labels for the plurality of locations on the particular post-tensioning cable. The label may additionally include information to help with shipping of materials to the site and/or the installation location within the structure for a group of cables corresponding to the label.

In an embodiment, a system comprises a plurality of post-tensioning cables; a plurality of support devices, each of which comprising a cable catch configured to hold the plurality of post-tensioning cables in place, a support steel configured to support the plurality of post-tensioning cables at a particular height, and a base configured to attach to support steels of different heights.

Structural Overview

FIG. 1 depicts an example system architecture for a post-tensioning cable tracking system. FIG. 1, and the other drawing figures and all of the description and claims in this disclosure, are intended to present, disclose and claim a wholly technical system with wholly technical elements that implement technical methods. In the disclosure, specially programmed computers, using a special-purpose distributed computer system design, execute functions that have not been available before in a new manner using instructions ordered in a new way, to provide a practical application of computing technology to the technical problem of automated, programmatic determination of topics in digitally stored natural language texts or transcripts. Every step or operation that is functionally described in the disclosure is intended for implementation using programmed instructions that are executed by computer. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In an embodiment, a label generation computing device 102 and a label reading computing device 120 are communicatively coupled over a network. The network broadly represents any combination of one or more data communication networks including local area networks, wide area networks, internetworks, or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The label generation computing device 102, label reading computing device 120, and other elements of the system may each comprise an interface compatible with the network and are programmed or configured to use standardized protocols for communication across the networks such as TCP/IP, Bluetooth, and higher-layer protocols such as HTTP, TLS, and the like.

Label generation computing device 102 may be implemented using a server-class computer or other computer having one or more processor cores, co-processors, or other computers. Label generation computing device 102 may be a physical server computer and/or virtual server instance stored in a data center, such as through cloud computing. Additionally or alternatively, label generation computing device 102 may be a smart phone, personal computer, tabled computing device, PDA, laptop, or any other computing device capable of transmitting and receiving information and performing the functions described herein.

Label generation computing device 102 stores project drawing 104. Project drawing 104 comprises data related to a project. Project drawing 104 may be in the form of a computer-aided design (CAD) drawing of a post-tensioning cable infrastructure for one or more concrete beams and/or may comprise data with a computing system can use to generate a drawing of the post-tensioning cable infrastructure.

Label generation computing device 102 uses project drawing 104 to create cable spreadsheet 106. Cable spreadsheet 106 comprises a data structure containing information relating to individual beams of a project. For example, the label generation computing device 102 may extract information from the project drawing 104 for a particular beam, such as a beam number, a number of cables in the beam, and/or cable profiles for the beam comprising heights of support devices along the cables. The label generation computing device 102 may use the extracted information to populate a row of a data structure where one or more columns of the row corresponds to a piece of extracted information. For example, a first column may correspond to a first support device height, a second column may correspond to a second support device height, and a third column may correspond to a number of cables in the beam.

Label generation computing device 102 uses cable spreadsheet 106 to create label configurations 108. Label configurations 108 may comprise data identifying information to be printed on each of a plurality of labels. Labels, as used herein, may refer to a printed item that is to be attached to an item, such as a cable or support device, and/or information that is printed directly onto the item. Label generation computing device 102 may execute one or more instructions to identify label configurations for each of a plurality of labels. For example, a first rule may specify that a value is to be extracted from a column of the data structure corresponding to a support device height based on the intended location for the label. Additionally or alternatively, the label generation computing device 102 may generate a computer-readable code for one or more labels which codifies information extracted from label spreadsheet 106 and/or codifies an identifier which can be used to find the information in label spreadsheet 106.

In an embodiment, label generation computing device 102 sends label configurations 108 to label printer 110. Label printer 110 comprises a printing device configured to print information on a label, such as by printing on an a separate attachable label or printing directly on an item such as a cable. The label printer 110 may be a standalone device that communicates with label generation computing device 102 over a network and/or may be directly coupled to the label generation computing device.

In one embodiment, label printer 110 prints labels 112 which are then affixed onto master cables 114 and/or support device 116. The affixing of labels onto master cables 114 and/or support device 116 may be performed manually or automatically by a special-purpose computing device. Master cables 114 comprise post-tensioning cables selected to contain one or more labels. Support devices 116 comprise physical structures configured to hold master cables 114 at one or more heights. Examples of support devices 116 are described further herein. In other embodiments, label printer 110 prints the label by printing information directly on cables 114, support device 116 or other items.

Label reading computing device 120 comprises a computing device configured to read a computer-readable code on one or more labels. Label reading device 120 may comprise one or more cameras or other methods of capturing an image of a computer-readable code. Label reading device may be a special-purpose device configured to scan labels and display a graphical user interface. Additionally or alternatively, label reading computing device 120 may be a smart phone, personal computer, tabled computing device, PDA, laptop, or any other computing device capable of transmitting and receiving information and performing the functions described herein.

Label reader computing device 120 comprises graphical display 122 and code reading instructions 124. Graphical display 122 comprises an interface in which label reader computing device 120 may display information relating to scanned labels and/or request input relating to scanned labels. Code reading instructions 124 comprise one or more instruction which, when executed by one or more processors of the label reader computing device 120, cause the label reader computing device 120 to interpret one or more codes captured from labels 112.

Label reader computing device 120 executes code reading instructions 124 to read codes on labels 112 which are affixed to master cables 114 and/or support device 116, or to read information from labels that have been directly printed on those items without separate labels. For example, label reader computing device 120 may capture an image of a computer-readable code on a label, printed separately or printed on an item, through a camera and/or scanning device of label reader computing device 120. Label reader computing device 120 may then execute the code reading instructions 124 to interpret the computer-readable code from the label.

While FIG. 1 depicts a limited number of computing devices for the purpose of providing a clear example, other embodiments may utilize any number of computing devices. For example, the label generating computing device 102 and/or label reading computing device 120 may be communicatively coupled to an external computing device which provides information relating to a worksite, such as cable profile information. As another example, while label generation computing device 102 is depicted as creating a cable spreadsheet 106 and using said spreadsheet to create label configurations, these steps may be performed separately by different computing devices. As a further example, label reader computing device 120 may comprise one or more of a separate scanning device, a separate display device, and/or an external computing device which provides information relating to the scanned label to the display device.

Label Generation

Figure 2:
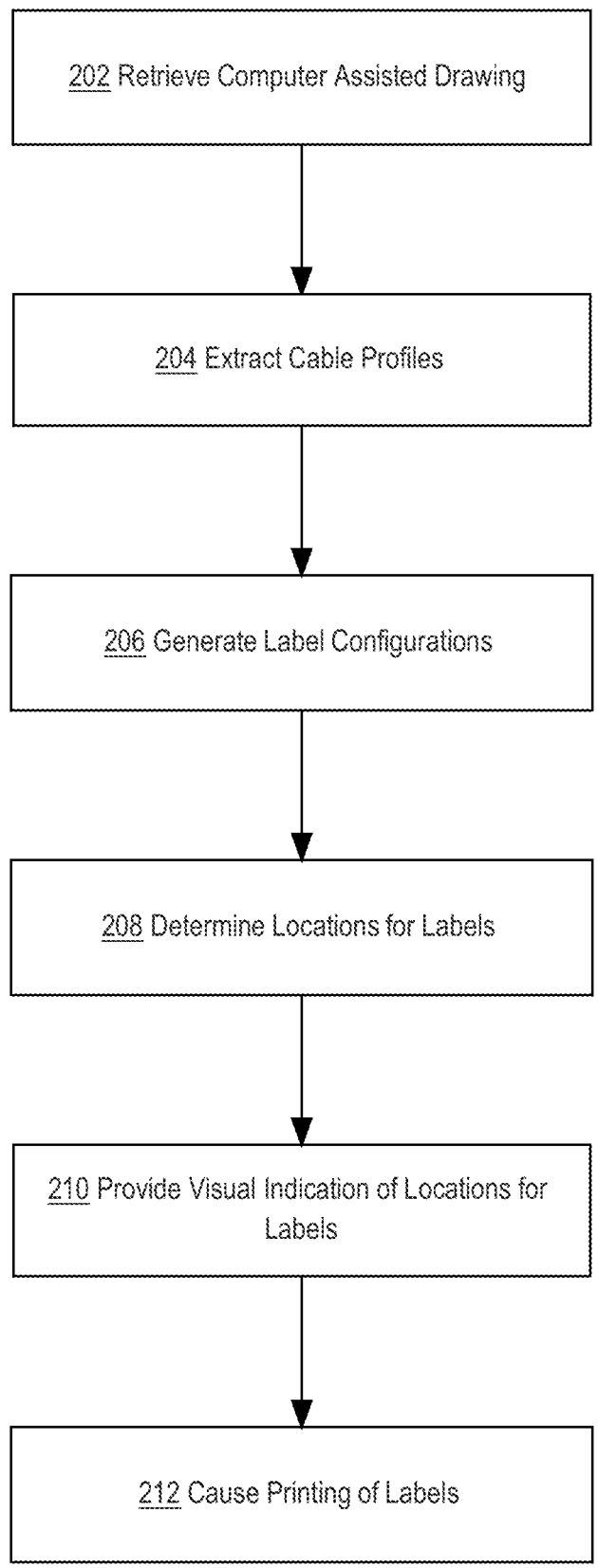
FIG. 2 depicts an example method for generating labels for master cables.

FIG. 2 depicts an example method for generating labels for master cables. The labeled master cables may then be used to verify correct placement of cables and/or support devices at a jobsite. A master cable, as used herein, refers to a labeled cable in a set of one or more cables. For example, in a single grouping of five cables, only one of the five cables may comprise labels. Alternatively, multiple cables in a grouping may comprise labels, thus making each of the multiple cables a master cable.

At step 202, computer-aided design (CAD) drawings are retrieved. The CAD drawings may comprise diagrams of a post-tensioning structures identifying, for each of a plurality of sets of cables, a location of the set of cables, a number of cables in the set of cables, a length of the set of cables, spacings of supports devices, and/or heights of the support devices. The CAD drawings may be retrieved from computer memory and/or sent of a network from an external computing device.

In an embodiment, the CAD drawings comprise data that can be used to generate an image, but do not comprise an image in and of themselves. For example, a CAD drawing may comprise values that could be input into a specialized program for generating images. The values may comprise values sufficient to extract necessary data for the cables. For example, the data may identify, for a set of cables, a number of cables, a spacing for support devices and/or number of support devices, a starting height of the cables, and a minimum height of the cables. A specialized program could compute the heights of each of the support devices such that the shape of the cable forms a particular shape, such as a parabola, with the minimum height of the cables in the middle of the cables.

Figure 3:
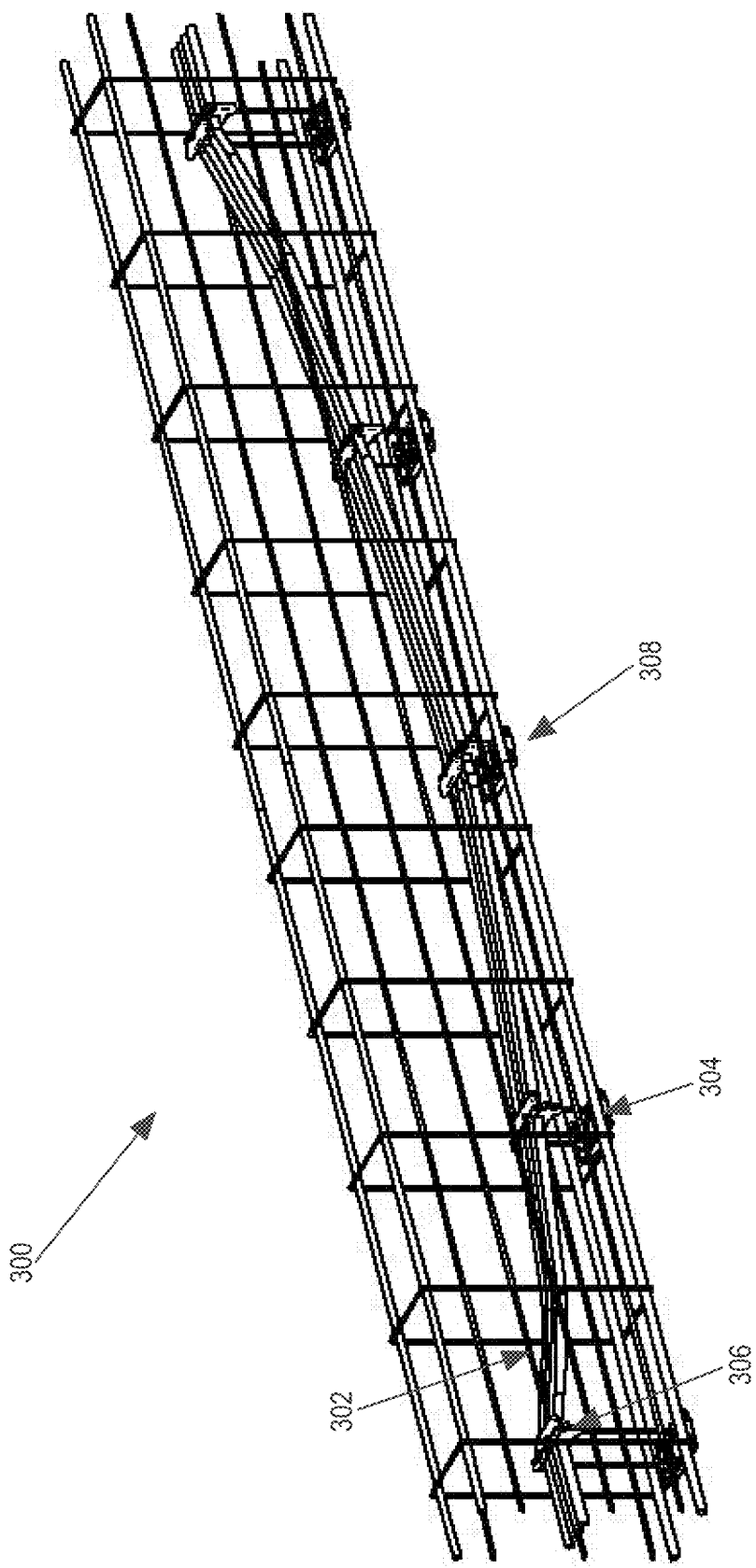
FIG. 3 depicts an example of a support device utilizing a plurality of tension cables.

FIG. 3 depicts an example of a support device utilizing a plurality of tension cables. Beam 300 comprises cables 302. Cables 302 comprise post-tensioning cables which are used to provide support to a concrete beam. Tension is applied to the cables through support device 304 which are spaced as specified by the CAD drawings or as by determined by the server computer. The cables 302 are configured with a particular maximum height 306 and a particular minimum height 308.

At step 204, cable profiles are extracted from the CAD drawings. A cable profile, as used herein, refers to a cable's length, locations of support devices along the cable, and heights of each of the support devices. The cable profile may also include a number of cables for a particular set of cables and/or a location of the cable within a job site. The location of the cable may comprise a value, such as a beam number that corresponds to beam numbers in the CAD drawings.

The locations and heights of the cable may be either provided in the CAD drawings and/or determined based on information from the CAD drawings. For example, if a CAD drawing specifies a minimum and maximum height for a cable, the system may generate an equation of a shape, such as a parabola, that fits those values and/or a graph of a the shape that fits those parameters. If the CAD drawings include a number of support devices, the system may compute a spacing of the support devices along the cable such that the support devices are either evenly spaced along the cable or evenly spaced in a horizontal plane. The system may then use the equation and/or graph of the shape to compute the heights for the support devices at each location. Additionally or alternatively, the system may store a spacing value which the system uses to compute the locations and/or heights of support devices on the cable based on the minimum and maximum vales.

In an embodiment, extracting the cable profiles comprises populating a cable spreadsheet with the information of the cable profile. The spreadsheet may comprise a plurality of rows corresponding to cables and/or sets of cables with columns corresponding to cable information, such as a location of the cables, support device heights, support device locations, and/or a number of cables within a set of cables. Alternative forms of storing the cable profiles may be used as long as the system can retrieve the cable profile from data storage.

At step 206, label configurations are generated from the cable profiles. Label configurations may comprise data identifying information to be printed on each of a plurality of labels, including separate labels to be placed on items such as cables or support devices and/or labels that are printed directly onto the items. The information in the label configurations may include an identification of a beam number or other location identifier, a number of cables in a set of cables, and/or a value indicating a height of the cable at a location corresponding to the label. Additionally or alternatively, the label configurations may include a computer-readable code which encodes one or more of the above pieces of data and/or a unique value for each label which corresponds to an intended position of the label at a particular location on the post-tensioning cable.

At step 208, locations for labels on the master cables are identified. For example, the system may determine a plurality of places on a cable to place labels. Placing labels may include physically affixing separate labels to the cable and/or printing the label directly onto the location, such as printing directly on a cable's plastic sheathing. The locations for the labels may correspond to locations where the cable is to be attached to a support device. For example, if stored data indicates that a first support device is to be attached at a location on the cable that is 55 centimeters from the end of the cable, then the server computer may identify said location as a first location for a label. In an embodiment, each locations corresponds to a unique label. For example, a label may be generated with information for a particular location, such as that location's height and/or an encoded value identifying the particular location.

At step 210, visual indications of locations for labels are provided. Visual indications for the locations of labels may be provided in a variety of ways, such as through an illuminated strip, markings on a cable, or a machine configured to place the location for the label in front of a user when a corresponding label is printed. These techniques are described further in the following section.

At step 212, the system causes printing of the labels. For example, the server computer may send instructions to a printing device to print one or more labels with corresponding label configuration data, where printing the labels comprises printing a label that is separate from the item on which it will be placed or printing equivalent information directly on cables, supports or other items. By providing a visual indication of a location to place the labels along with the printed labels, the system reduces errors in labeling the cables while also increasing the ease of operation of the methods described herein. Additionally, the labels themselves provide benefits in the configuration of post-tensioning systems and the reduction of errors in verifying proper configuration of post-tensioning systems, as will be described further herein.

Labeling Methods

The labeling methods described herein may be utilized to provide clearer instructions to a user applying the labels, thereby reducing errors in label application while providing an interface which reduces complexity and difficulty in label application.

A first labeling method comprises utilizing an illuminated strip to indicate where on a cable to place a label. The illuminated strip may comprise a strip of fabric or other material with lights placed on the illuminated strip at regular intervals, such as every two centimeters. In an embodiment, the lights comprise light emitting diodes (LEDs). An electronic controller may individually control each of the lights, thereby causing only particular lights to be illuminated at a time.

The server computer or other computing device may send instructions to the electronic controller to cause the electronic controller to illuminate only the lights in positions which correspond to label positions. For example, if the illuminated strip comprises an LED every 2 centimeters and the first label is 20 centimeters down the cable, the instructions may cause the electronic controller to illuminate the tenth LED on the illuminated strip, such that the illuminated strip comprises a lit LED 20 centimeters down the cable.

In an embodiment, the server computer causes multiple lights to be illuminated for each of the labels. For example, if a label is to be placed 20 centimeters down the cable and the label is 6 centimeters long, the server computer may send instructions to the electronic controller to cause the tenth, eleventh, and twelfth light to be illuminated.

Figure 4:
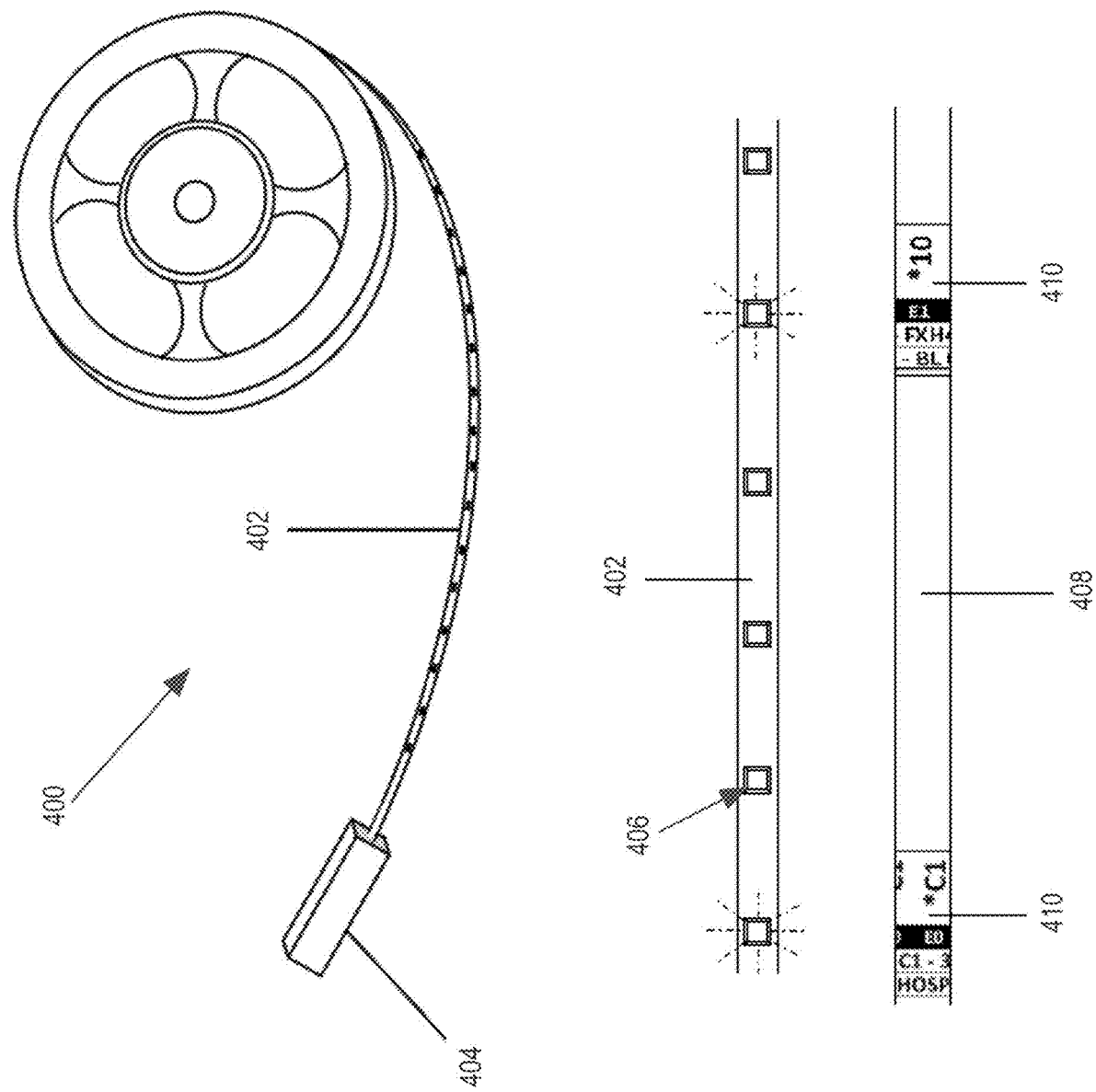
FIG. 4 depicts an example of an illuminated strip for identifying locations for one or more labels.

FIG. 4 depicts an example of an illuminated strip for identifying locations for one or more labels. Device 400 comprises illuminated strip 402 and electronic controller 404. Illuminated strip 402 comprises a flexible material, such as a flexible plastic or rubber, on which lights 406 are attached. Wires from lights 406 may run the length of the illuminated strip 402 and attach to electronic controller 404. Electronic controller may send a signal through the wires to cause illumination of one or more lights 406 based on received input. For example, in FIG. 4 the first and fifth light are illuminated while the remainder of the lights are not illuminated.

Electronic controller 404 may be configured to communicate with a computing device. For example, electronic controller 404 may comprise a wireless chip, Bluetooth module, or other means of wirelessly receiving instructions from a computing device. Additionally or alternatively, electronic controller 404 may comprise means for establishing a wired connection to a computing device, such as a port for one or more wires or a cable for attaching to a port of a computing device.

Electronic controller 404 may receive instructions from an external computing device to cause illumination of a strict subset of lights 406 on illuminated strip 402. The locations of the illuminated lights 406 may correspond to locations for labels 410 on master cable 408. Thus, when the illuminated strip 402 is laid flat parallel to the master cable 408, the illuminated lights 406 may appear next to the locations where a label is to be placed on master cable 408, thereby providing clear visual instructions on where to place labels 410.

A second labeling method comprises utilizing a cable cutting machine to identify locations for labels. Thus, cables may be labeled as the cables are cut to the specifications for the post-tensioning system. A cable cutting machine may be configured to pull a cable through the machine until a given length of cable has passed through and then cut the cable, thereby creating a cable of a specified length. During the process, the cable cutting machine may either mark the cables for labeling or otherwise indicate locations to place the labels.

Figure 5:
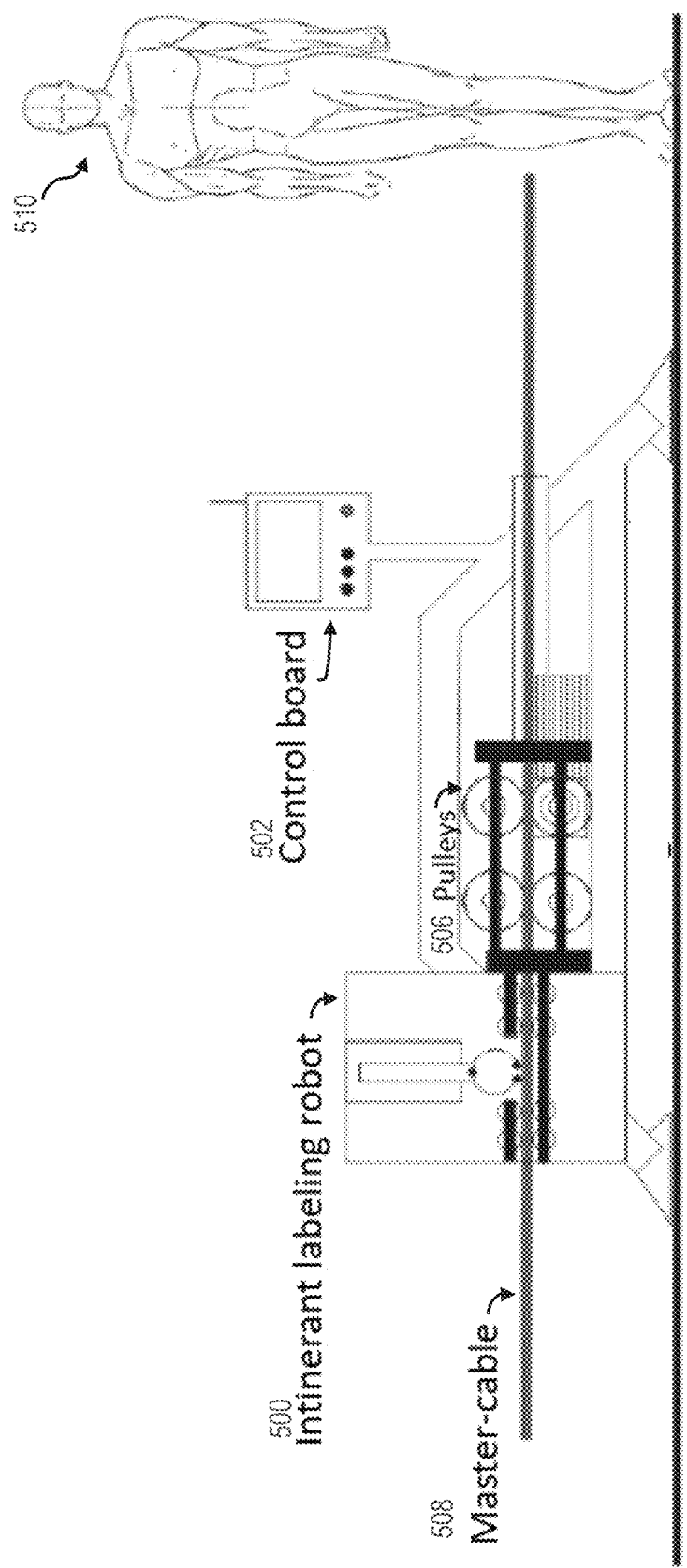
FIG. 5 depicts an example of a machine that can be used to cut and/or provide indications of where to place labels on a master cable.

FIG. 5 depicts an example of a machine that can be used to cut and/or provide indications of where to place labels on a master cable. Iterant labeling robot 500 comprises control board 502. Control board 502 controls the iterant labeling robot 500, such as by causing pulleys 506 to rotate or to cease rotating at given points in time. Control board 502 may receive instructions for the length of the cable and the locations for labels from an external computing device and/or through direct input.

In an embodiment, the control board 502 receives or stores data identifying label locations on a master cable. The control board 502 causes pulleys 506 to rotate to cause master cable 508 to be pulled through iterant labeling robot 500. When cable has been pulled to a position such that a first location for labels is in a particular position, the control board 502 may send a signal to cause the pulleys 506 to cease rotating, thereby causing the cable to stop moving through iterant labeling robot 500.

In an embodiment, in conjunction with the stopping of the cable, a label may be printed to be placed on the cable at the available location. The label printer may be connected to the iterant labeling robot 500 or may be separate from the iterant labeling robot. Thus, an operator 510 may take the label printed for the displayed location on the master cable and apply it directly to the master cable. Additionally or alternatively, labels may be printed in advance and applied to the master cable in order. The control board 502 may receive feedback indicating that the label has been placed and, in response, restart the pulleys 506 until the next position has been reached. Additionally or alternatively, the control board 502 may wait a predetermined period of time, such as 10 seconds, so that a label can be placed before restarting the pulleys.

In an embodiment, the iterant labeling robot 500 comprises a printer configured to print directly onto the cable. The iterant labeling robot 500 may print markers on the master cable 508 which indicate that a label is to be placed on top of the marker. Additionally or alternatively, the iterant labeling robot 500 may print information directly onto the cable. Thus, the labeling of the cable may be performed by the iterant labeling robot 500 printing the label information directly onto the cable.

Cable Infrastructure

Figure 6:
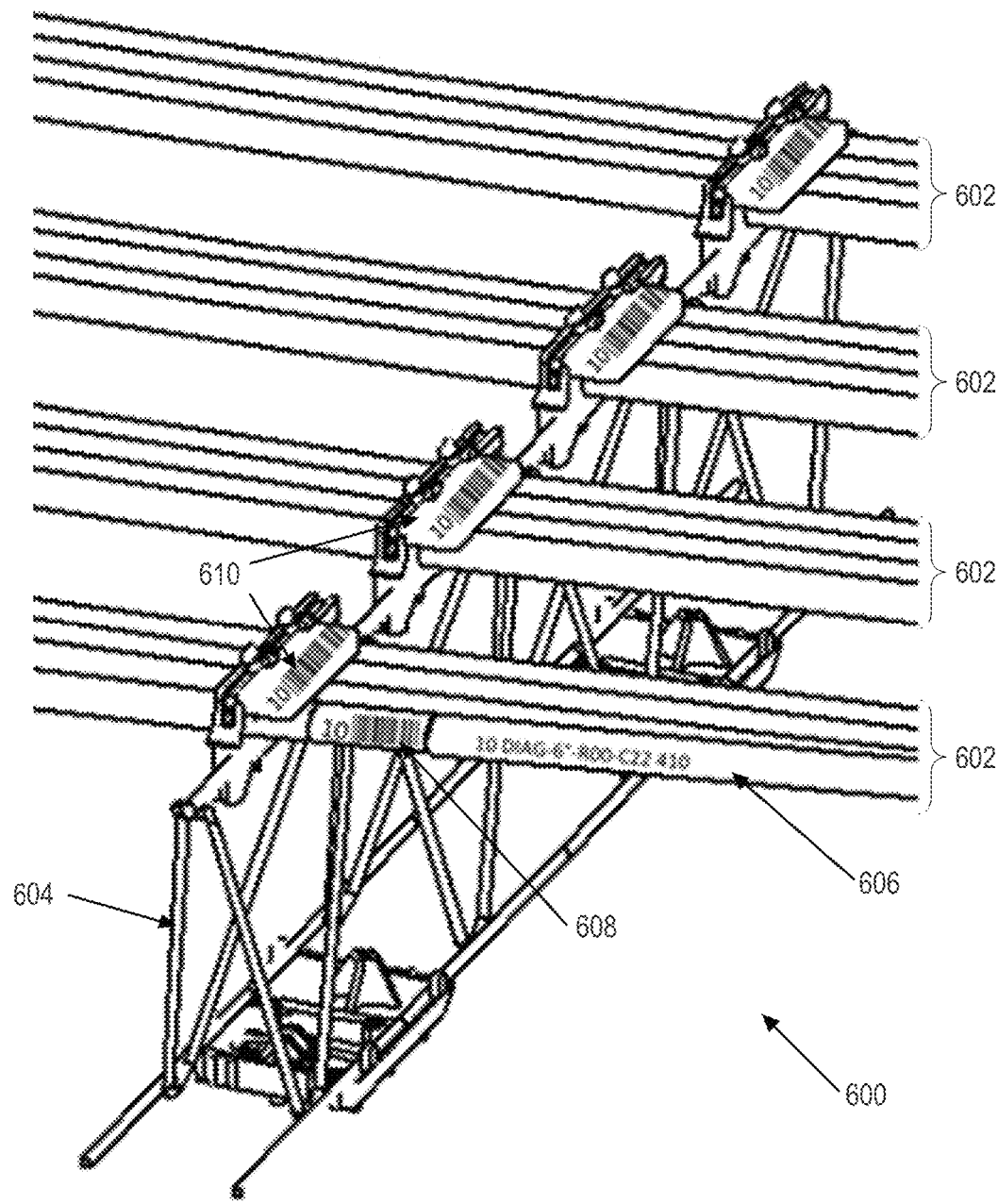
FIG. 6 depicts an example cable infrastructure comprising labeled cables and support devices.

Master cables may be combined with additional cables and/or support devices to provide a cable structure for pouring concrete. Using the methods described herein, the cable structure can be created in a manner that allows easy verification of correct installment. FIG. 6 depicts an example cable infrastructure comprising labeled cables and support devices.

Cable infrastructure 600 comprises cables 602 and one or more support devices 604. Cables 602 comprise one or more cables configured to provide support to poured concrete. Cables 602 in FIG. 6 comprise a plurality of groupings of cables for a particular beam with each grouping comprising a plurality of cables. Beams may comprise a plurality of support devices 604 spaced along cables 602. Cables 602 comprise a master cable 606. Master cable 606 is a cable that is marked with information regarding the cables and/or beam. For instance, master cable 606 in FIG. 6 comprises label 608. While cables 602 are depicted as containing a label only on a single master cable, in an embodiment a plurality of cables may comprise labels, such as one cable per grouping or each cable in the set of cables.

In an embodiment, the labels comprise one or more of: data about a construction site, level, project, or customer, identification of the particular post-tensioning cable, or a spacing value indicating a horizontal spacing between elevation support points along the particular post tensioning cable. For example, the labels may comprise project identifiers, location identifiers, customer identifiers, or information which can be used to configure the cables and/or verify their placement, such as a location of the cable within a project, such as a beam number, a value indicating a height of a corresponding support device, and/or other information relating to the cable and/or support device. In an embodiment, the labels additionally contain a computer-readable code unique to the set of cables and/or unique to the label. In the embodiment of FIG. 6, the label comprises a computer-readable code and a height of the adjacent support device. Additionally or alternatively, information may be printed along the side of the master cable, such as depicted in FIG. 6.

Support devices 606 comprise structures configured to hold cables 602 at particular heights along the length of the cables 602. Example support devices are described further herein. In an embodiment, support devices also comprise labels 610. Labels 610 may comprise values identifying locations of the support devices, such as a value indicating where along a cable the support device is placed and/or a beam number, a height of the support device, and/or other information relating to the cable and/or support device. In the embodiment of FIG. 6, the labels 610 on support devices 606 comprise a value indicating the height of the support device and a computer-readable code.

Support and Assembly Structure

Figure 7:
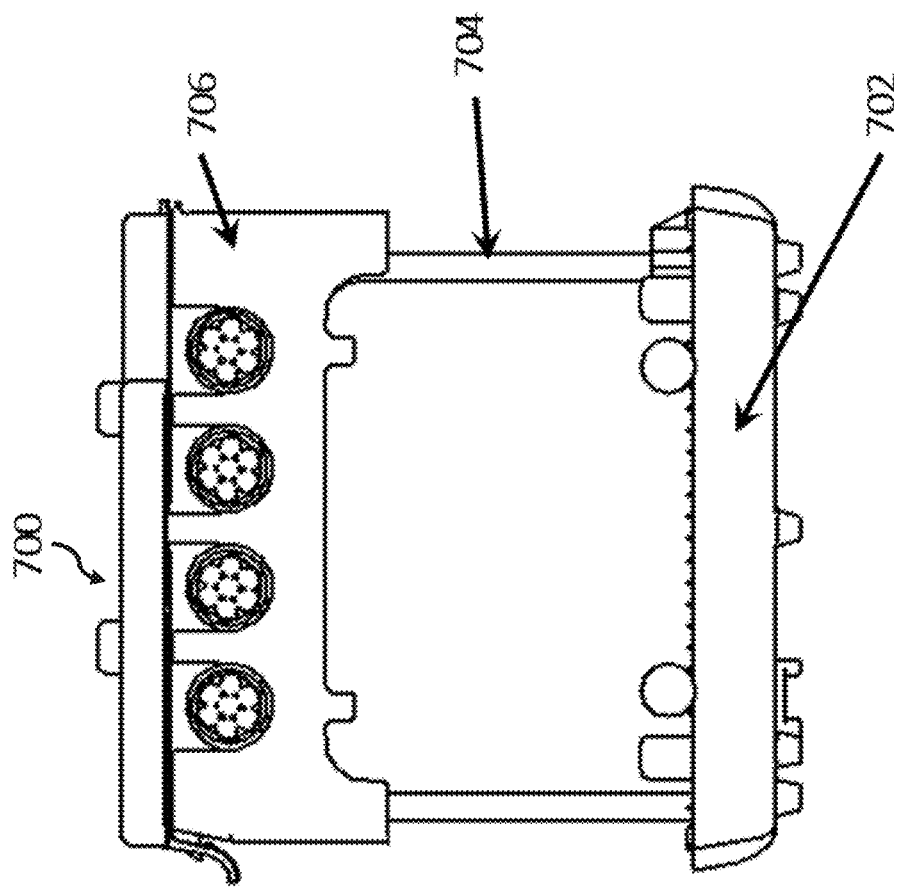
FIG. 7 depicts an example support device for post-tensioning cables.
Figure 7:
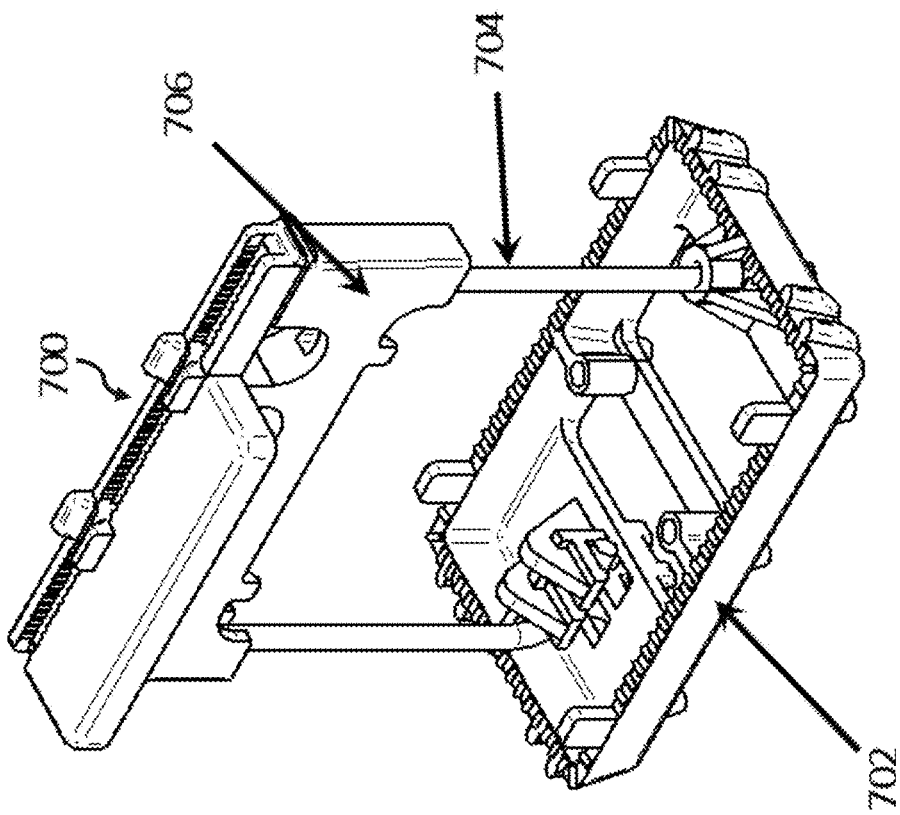

FIG. 7 depicts an example support device for post-tensioning cables. Support device 700 comprises base 702, configurable spacer 704, and cable catch 706. Base 702 may comprise a base configured to sit on a flat surface and to be connected to configurable spacer 704. Base 702 may be made from plastic, acrylic, metal, or any supportive material. Base 702 contains one or more slots into which a configurable spacer 704 may be placed to hold up cable catch 706.

Configurable spacer 704 comprises a hard structure which can be placed into base 702 to hold up cable catch 706. Configurable spacer 704 may be a metal bar, plastic or acrylic stand, or other structure made out of another material which is sufficiently sturdy to hold cable catch 706 steady when cables are placed inside cable catch 706. In an embodiment, configurable spacer 704 is a bent piece of metal, such as a thin metal rod, which is bent such that the height of the configurable spacer 704 in addition to the height of the base is equivalent to an intended particular height of the support device. Configurable spacer 704 may be any of a plurality of heights and different support devices in a single beam may have configurable spacers of different heights.

By allowing the height of the configurable spacer 704 to dictate the height of the support device 700, the support device 700 is customizable to the many different heights required at worksites while also allowing the bases and cable catches to be uniformly configured across all support devices. Thus, to create a support device of a particular height, a particular configurable spacer 704 can be connected to a generic base 700 and a generic cable catch 706. As used herein, "generic" refers to the uniformity of the size and shape of the base and cable catch structures across different support devices.

Figure 8:
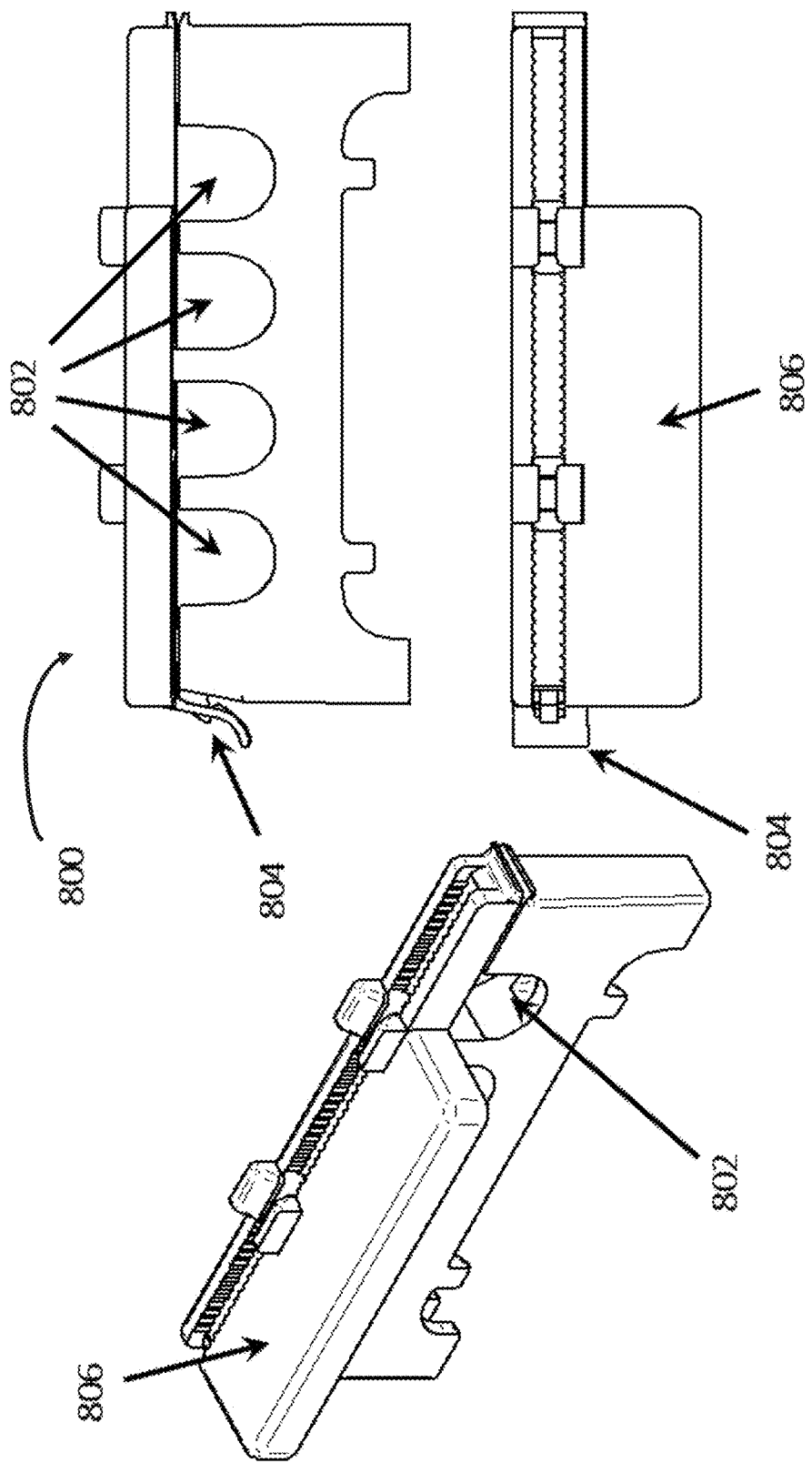
FIG. 8 depicts an example cable catch for holding post-tensioning cables in place in a support device.

FIG. 8 depicts an example cable catch for holding post-tensioning cables in place in a support device. Cable catch 800 is configured to be attached to a configurable spacer which is attached to a base of a support device, such as the support device of FIG. 7. Cable catch 800 comprises cable holes 802, locking mechanism 804, and label location 806. Cable holes 802 comprise cylindrical gaps in cable catch 800 configured to hold cables in place. Locking mechanism 804 comprises a mechanism which locks a top of cable catch 800 into place, thereby locking cables in place. For example, the top of cable catch may be movable and/or removable so that cables may be slotted into cable catch 800. The locking mechanism 804 may be any means of holding the top of cable catch 800 in place, such as a piece of plastic that closes over a lip to hold the top of the cable catch in place.

Figure 9:
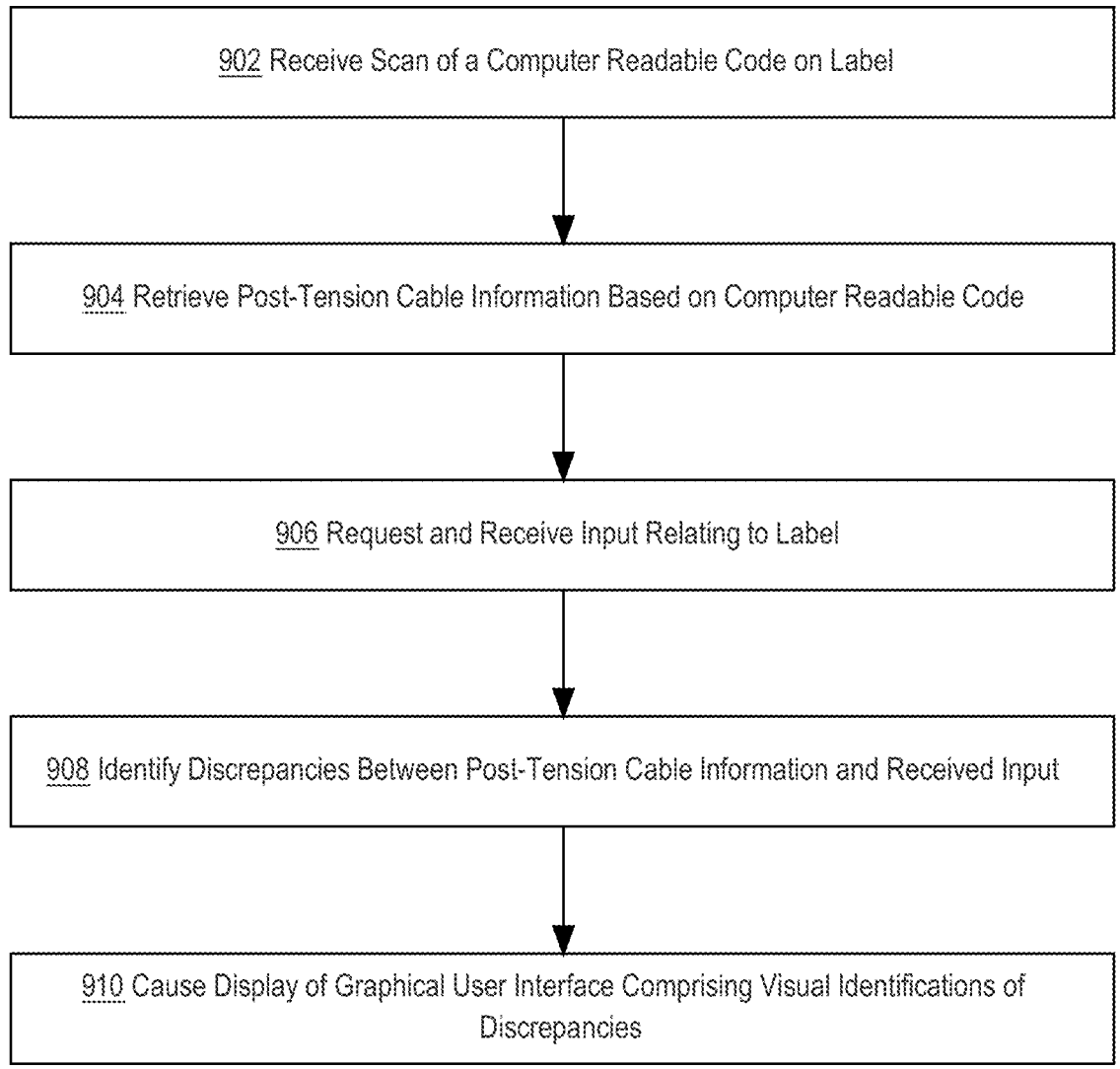
FIG. 9 depicts an example method for verifying correct placement of cables using printed codes.

Label location 806 comprises a visible portion of the cable catch 800 configured to hold a label with information relating to the cable catch and or cables. For example, a label on the label location 806 may comprise a value indicating a height of the support device and/or a computer-readable code as described further herein. In addition, a label scanning device can be used to capture the information encrypted in the bar codes, or QR codes, present on the labels and instruct which support device to use at each point, thus allowing the assembly itself to be validated by the checking system, ensuring greater reliability in the assembly and distribution of cables. After scanning a label, the label scanning device also shows the name of the master cable, the name of the construction site, the total number of cables that make up that bundle and, as previously mentioned, the size of the support device should be used. CABLE VERIFICATION USING LABELS FIG. 9 depicts an example method for verifying correct placement of cables using printed codes.

At step 902, a scan of a computer readable code on a label is received at a label scanning device. For example, a code scanner may be used to scan a barcode or quick read (QR) code on a label. The label may be placed on a master cable and/or support device. The label scanning device may comprise an input interface through which an operator may input information relating to the label, cable, and/or support devices.

Figure 10:
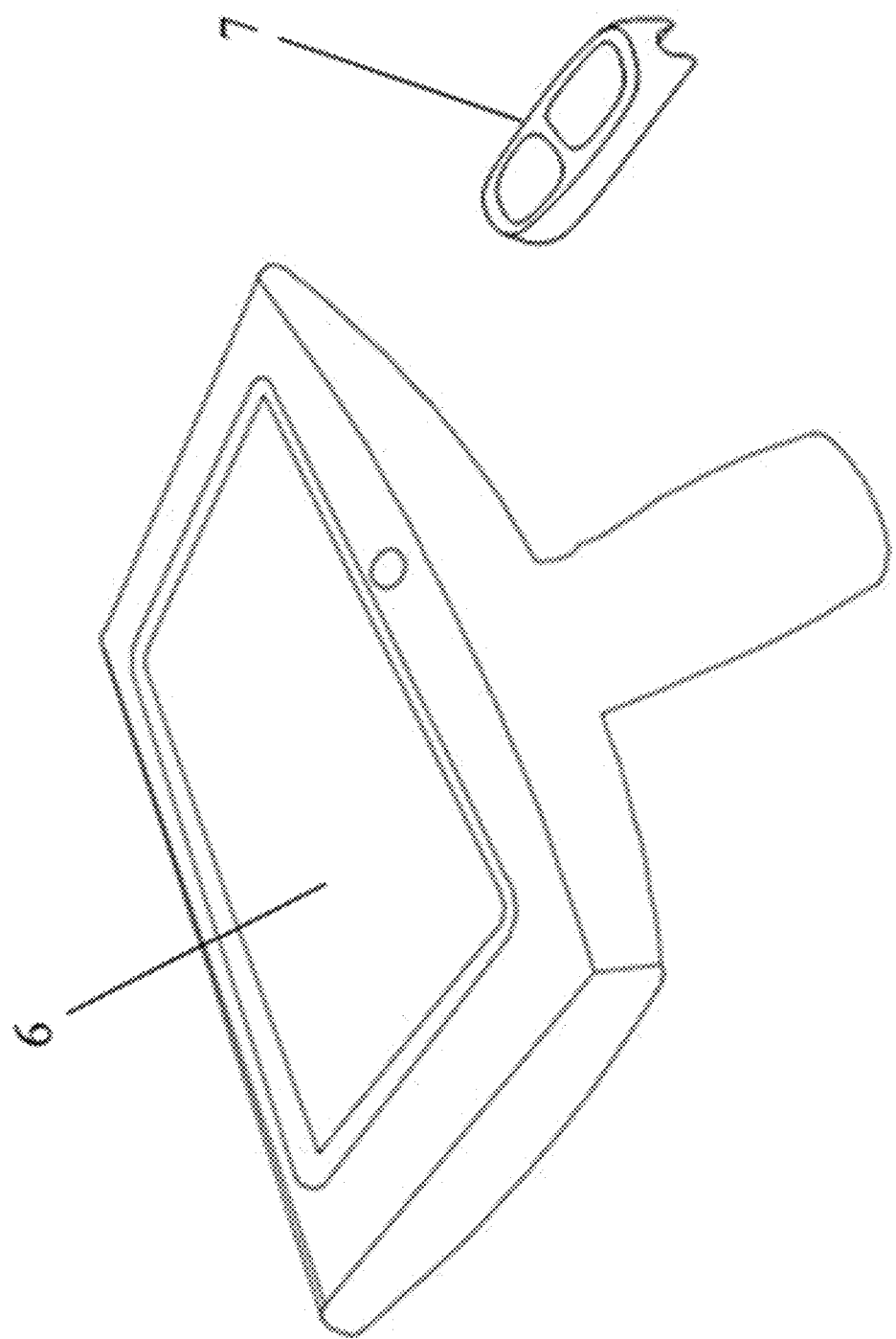
FIG. 10 depicts an example of a label scanning device.

FIG. 10 depicts an example of a label scanning device. Label scanner 1000 comprises code reader 1002 and display device 1004. The code reader 1002 may be communicatively coupled to the display device over a wireless network. Additionally or alternatively, the code reader 1002 may be physically attached to the display device 1004. The display device 1004 may comprise one or more processors configured to analyze incoming information, provide a graphical user feedback, and store information in a memory of the display device. The display device 1004 may additionally be configured to display stored images, such as design images of a worksite. The display device 1004 may additionally comprise an input interface, such as a touchscreen or physical buttons or switches.

In an embodiment, the display device 1004 initially displays, through a graphical user interface, a request for input specifying a location of the label that is being scanned. For example, an interface may request input specifying a beam number of the cables and support devices. As another example, a selectable image of the worksite may be displayed on the display device 1004 through which an operator may select a location at which the label is to be scanned. Additionally or alternatively, the location of the display device 1004 may be determine through GPS or multilateration of signals sent from the display device 1004. In response to receiving input specifying the location of the label that is being scanned, the display device 1004 may request a scanning of the label. The user may then scan the label using the code reader 1002.

At step 904, post-tension cable information is retrieved based on the computer-readable code. For example, a computer readable code on the label may codify information relating to the cable, support devices, or cable's placement. For example, the code may comprise a value indicating a location of the cable, such as a beam number, a number of cables in a set of cables, a height of a support device located on or near the cable, and/or heights of a plurality of support devices. Additionally or alternatively, the computer readable code on the label may codify an identifier of the label, identifier of the cable, or identifier of the set of cables. In response to unique identifier in the computer-readable code, the computing device may look up the post-tension cable information, such as from a spreadsheet containing post-tension cable information. The information may include a profile of the cable comprising heights for each of a plurality of support devices, a height of an adjacent or nearby support device, a location of the cable, and/or a number of cables in a set of cables.

In an embodiment, the computing device initially determines whether input received prior to the scanning of the label matches the post-tension cable information that was retrieved based on the computer-readable code. For example, the computing device may determine whether location information retrieved from the computer-readable code and/or from storage based on the computer-readable code matches the input specifying the location of the cable. If the location information does not match, the computing device may display an error and/or visually indicate a location of a cable that matches the input location. As a practical example, if the user indicates that the cable is in "Beam 2" and the scanned cable is actually in "Beam 3", the computing device may display an error with the correct beam number. Additionally or alternatively, the computing device may display an image of the worksite, such as a CAD drawing, with a marking indicating a location of the scanned label and a second marking indicating the location of the correct cable.

At step 906, input is requested and received relating to the label. For example, the computing device may request input specifying the number of cables in a set of cables containing the cable with the scanned label. The display device may display an interface whereby the user may input the number of cables in the set of cables. As an example, in the structure of FIG. 5, four cables are depicted being held in place by a support device. Thus, the user may input the number four in response to a request for input as to the number of cables in the beam.

In an embodiment, the request for input comprises a request to input a height of a corresponding support device, scan a label on a corresponding support device, input heights of a plurality of support devices, and/or scan labels on a plurality of support devices. For example, the display device may display a request to scan all of the support devices in a single beam from one end to the other. The user may use the code reader to scan computer-readable codes on labels of support devices from one end of the beam to the other. The display device may determine the heights of each support device from the scanned computer-readable codes, such as through lookup of a unique identifier or decoding of a value in the computer-readable code. In an embodiment, the display device displays the heights of the support devices when they are scanned. As another example, the support devices may contain labels with a height number printed directly on the label. The user may input the height numbers for each support device through an interface provided by the display device.

Step 906 may be used to verify the profile of the cable, such as through scanning of all support devices in a beam, or to spot check specific support devices. In order to verify the profile of the cable, individual labels on the master cable may identify at least the profile of the cable, the profile of the cable comprising heights for each of a plurality of support devices. In order to spot check specific support devices, the labels on the master cable may additionally identify a location of the label on the master cable. For example, labels may be placed at locations with support devices. The computer-readable code may codify the location on the label and/or a height of an immediately adjacent support device. To spot check a support device, the user may initially scan the label on the cable. The display device may request and receive input specifying the height of an adjacent support device and/or request and receive a scanning of a computer-readable code on a label of an adjacent support device from which the height of the adjacent support device can be obtained.

At step 908, discrepancies between the post-tension cable information and received input are identified. For example, the label scanning device and/or external computing device may compare the received input, such as the support device scans and/or input specifying cable numbers, with the stored post-tension cable information for the cable comprising the label comprising the computer-readable code. As a practical example, if the cable profile retrieved based on the scan of the computer-readable code indicates that the support device heights for the first three support devices are 8 feet, 7 feet, and 6 feet and the data retrieved from scans of support devices indicate that the first three support devices are 8 feet, 5 feet, and 6 feet, the label scanning device and/or external computing device may identify a discrepancy with the height of the second scanned support device.

At step 910, the system causes display of a graphical user interface comprising visual identification of discrepancies. For example, the label scanning device may display, through the display device, the scanned heights or input heights of the support devices adjacent to the corresponding heights from the cable profile. Where the scanned support device does not match the cable profile height, the display device may highlight the different numbers, such as through a bolding of the text, a different color of the text, or other visual indication of a discrepancy of the text. As another example, a chart may comprise a first graph of the heights of the support devices as scanned and a second graph of the heights in the cable profiles. In locations where the heights do not match, the height of the support device as scanned may be visually distinct to indicate the discrepancy.

Discrepancies may also be displayed visually on an image of the worksite. For example, the display device may display a CAD drawing of the worksite with visual indicators identifying locations, such as support devices or beams, where the input or scanned data did not match the cable profile data. By visually indicating the locations of the discrepancies, the display device provides feedback to the user on which the user can immediately act. For example, if the discrepancy is identified in the second support device, the user can easily see where the discrepancy occurred and move to that location to determine the cause of the discrepancy.

In an embodiment, one or more reports are sent to an external computing device identifying any discrepancies identified at the worksite. For example, the user may perform the method of FIG. 9 for a plurality of beams in a plurality of locations on the worksite. The label scanning device and/or an external computing device may generate a report which identifies, for each beam, cable, and/or support device, whether a discrepancy was identified, what the discrepancy was, and/or where the discrepancy occurred.

Implementation Example: Display Interfaces

FIG. 12-16 comprise example display interfaces for the methods describe previously herein. One or more of the example display interfaces may be displayed on a display device, such as the device depicted in FIG. 10, during execution of the method as described below.

Figure 12:
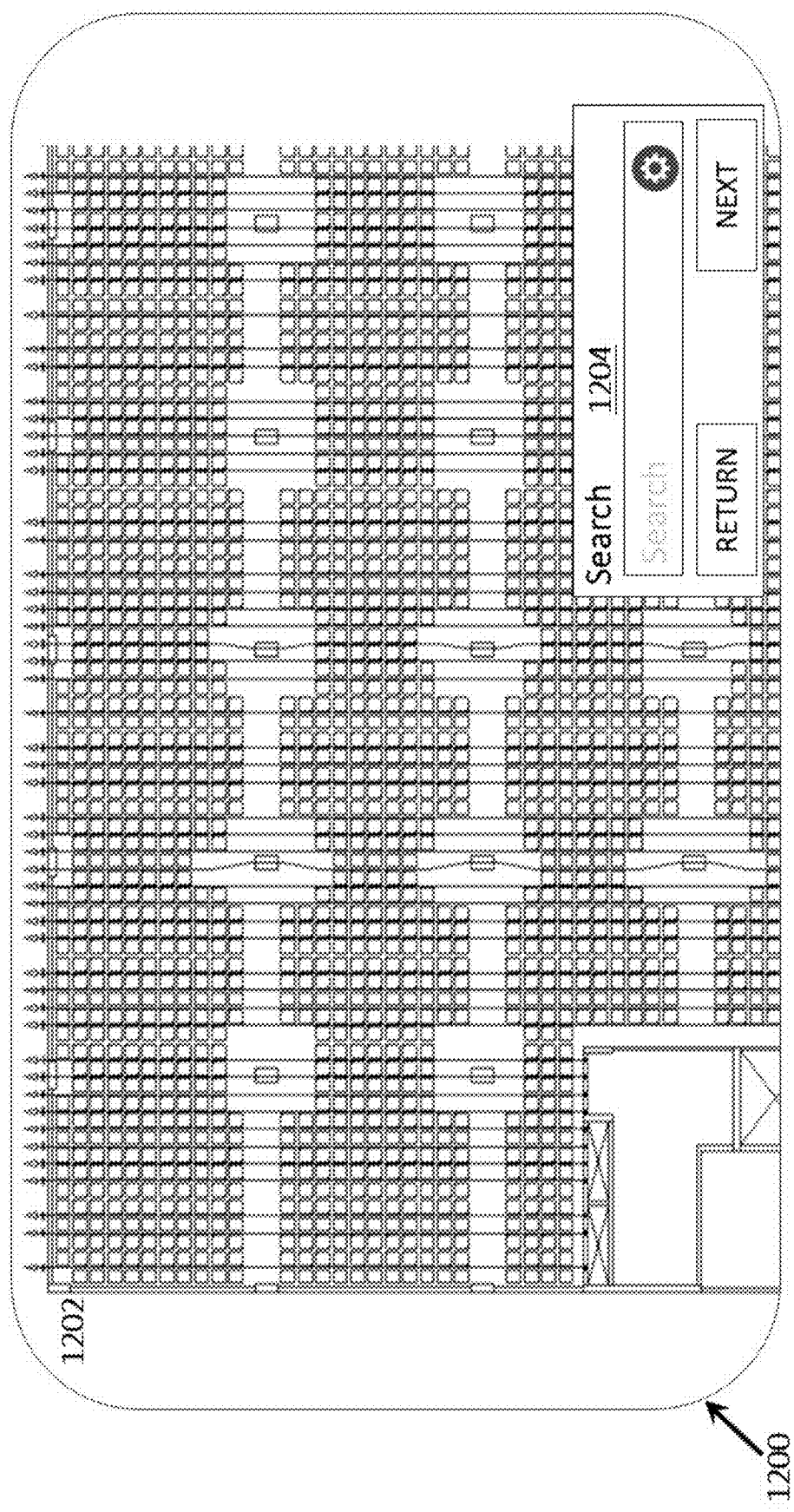
FIG. 12 depicts an example of a display device displaying an image of a worksite.

Initially, a display device may display an image of the worksite. For example, the display device may request input specifying a particular project or worksite. The display device may display the image of the worksite at least partially in response to the input specifying the particular project or worksite. FIG. 12 depicts an example of a display device displaying an image of a worksite. Display device 1200 displays worksite image 1202. Worksite image 1202 may depict project plans for a particular project, such as through a CAD drawing.

The worksite drawings may be used to identify a location of a cable to be scanned. In an embodiment, the interface displayed on display device 1200 comprises location input interface 1204. Location input interface 1204 comprises an interface which accepts input identifying a location of the scanning device. For example, a user may input a beam number into the location input interface 1204 based on information from the worksite image.

Figure 13:
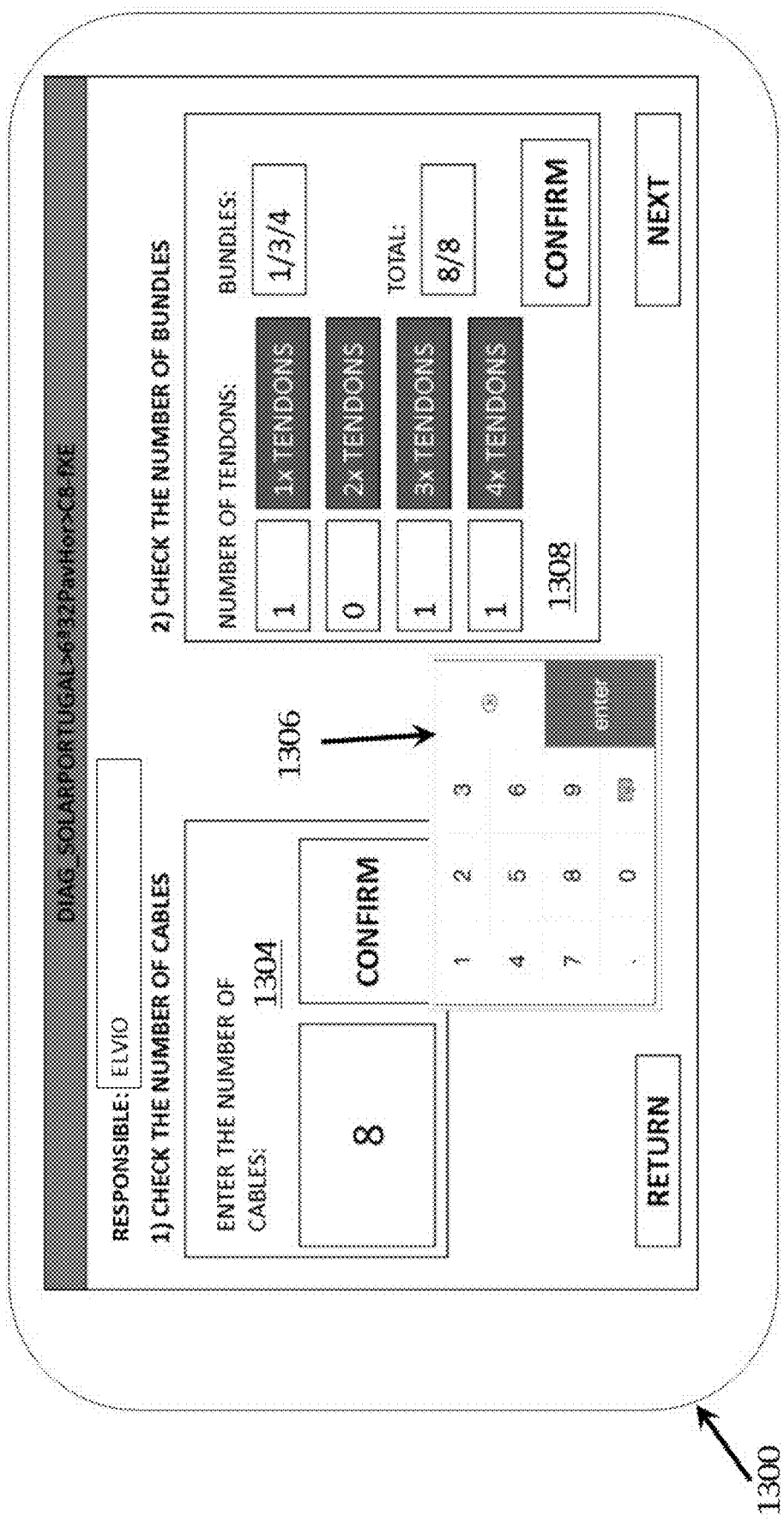
FIG. 13 depicts an example of a display device displaying a request for input specifying a number of cables for a particular location.

In response to receiving input specifying a location of the cable to be scanned, the display device may display a request to input a number of cables for the location. FIG. 13 depicts an example of a display device displaying a request for input specifying a number of cables for a particular location. Display device 1300 displays cable input interface 1302. Display cable input interface 1302 may be displayed in response to receiving a scan of a computer-readable code on a label on a master cable through a scanning device.

Display cable input interface 1302 comprises cable number input 1304, input controls 1306, and cable set input 1308. Cable number input 1304 comprises an interface for inputting a total number of cables within a set. Input controls 1306 comprise selectable options for inputting data into cable number input 1302 and/or cable set input 1308. Cable set input 1308 comprises an interface for inputting a number of cables for each grouping type of cables. In an embodiment, a computing device verifies a total number of cables in cable number input 1304 matches the number of cables for each type of grouping in cable set input 1308. For example, in FIG. 13, the input specifies that there is one grouping of one cable, one grouping of three cables, and one grouping of four cables, for a total of eight cables. As the total of the cable set input 1308 matches the total of cable number input 1302, the display device 1300 does not display an error. The input number of cables may then be verified against stored post-tension cable information.

Figure 14:
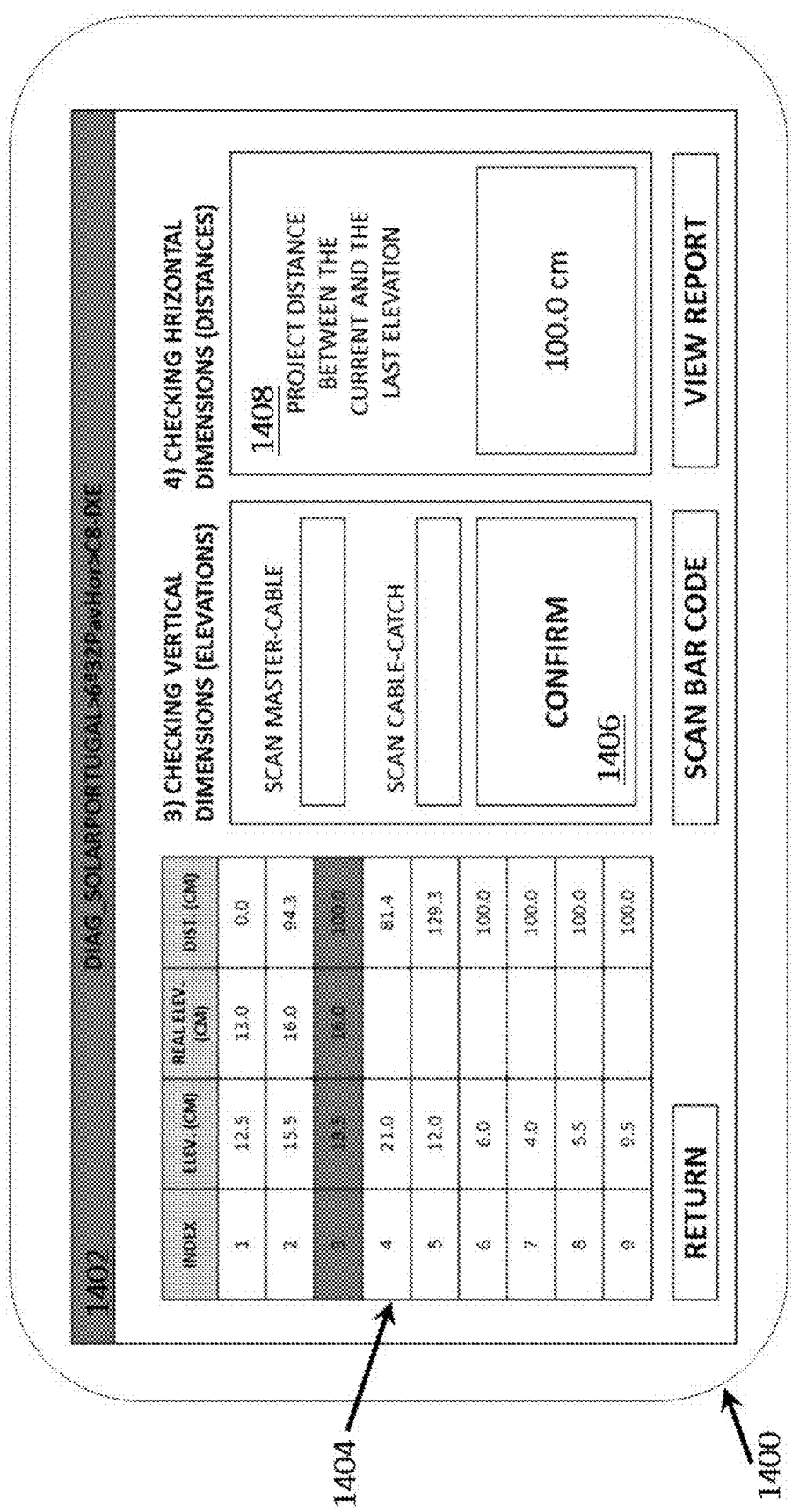
FIG. 14 depicts an example of a display device display a support device scanning interface.

If the input number of cables does not match the stored post-tension cable information, the display device may display an error and request correction. If the input number of cables matches the stored post-tension cable information, the display device may display a request for support device information. FIG. 14 depicts an example of a display device displaying a support device scanning interface. Display device 1400 displays a support device interface 1402. Support device interface 1402 comprises comparisons 1404, scan interface 1406, and spacing confirmation 1408.

In an embodiment, scan interface 1406 comprises an interface used to initiate a scan of one or more support devices. The interface may specify which support device is to be scanned next and may auto-populate with support device information when a computer-readable code on a support device is scanned. Heights from the scanned support devices may be compared with heights from the stored post-tension cable information in comparisons 1404. Errors may be visually displayed in the comparisons 1404 when a height from the support devices does not match the height of the support devices in the stored post-tension cable information, such as is displayed for support device #3 in FIG. 14. Spacing confirmation 1408 may comprise data identifying the spacing of the support devices. The user may verify the spacing through physical measurements and/or by verifying that the support devices are place next to their corresponding labels.

Figure 15:
FIG. 15 depicts an example display device displaying a verification report.

In an embodiment, one or more reports are generated based on the information input through the interfaces described above. The reports may include visually distinguished errors from the verification inputs described above. FIG. 15 depicts an example display device displaying a verification report. Display device 1500 comprises report display 1502. Report display 1502 identifies each support device for a set of cables, the designed heights for the support devices, the actual heights of the support devices as determined through the scanned input, spacings between the support devices, and a status of the verification of the support devices which can include a verified status, an error status, or an in-progress status.

Figure 16:
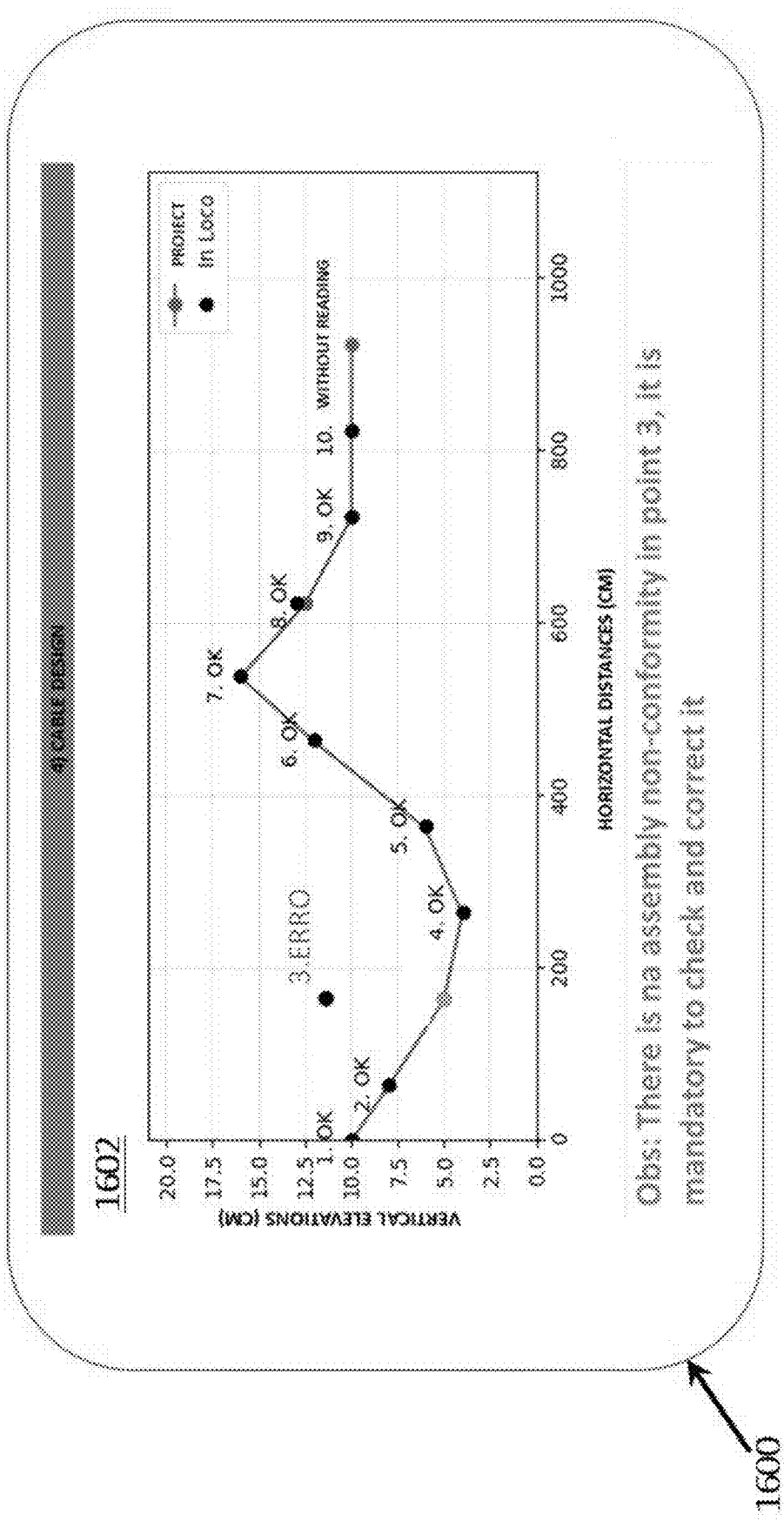
FIG. 16 depicts an example display device displaying a graph report.

Other reports may graphically depict any discrepancies identified during the verification process. FIG. 16 depicts an example display device displaying a graph report. Display device 1600 includes graph 1602. Graph 1602 comprises a graph of the support devices with the x-axis corresponding to a horizontal distance of the support devices and the y-axis corresponding to a height of the support device. Two sets of points are depicted on the graph 1602. The first set of points corresponds to the support device heights as determined from the stored post-tension cable information. The second set of points corresponds to the actual scanned heights of the support device. As is shown in FIG. 16, when one of the scanned heights does not match, the graph makes the error noticeable. Additionally, the graph may include additional visual indications such as the words "Error" or a change in color of the text near the data point or the data point itself.

Implementation Example: Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
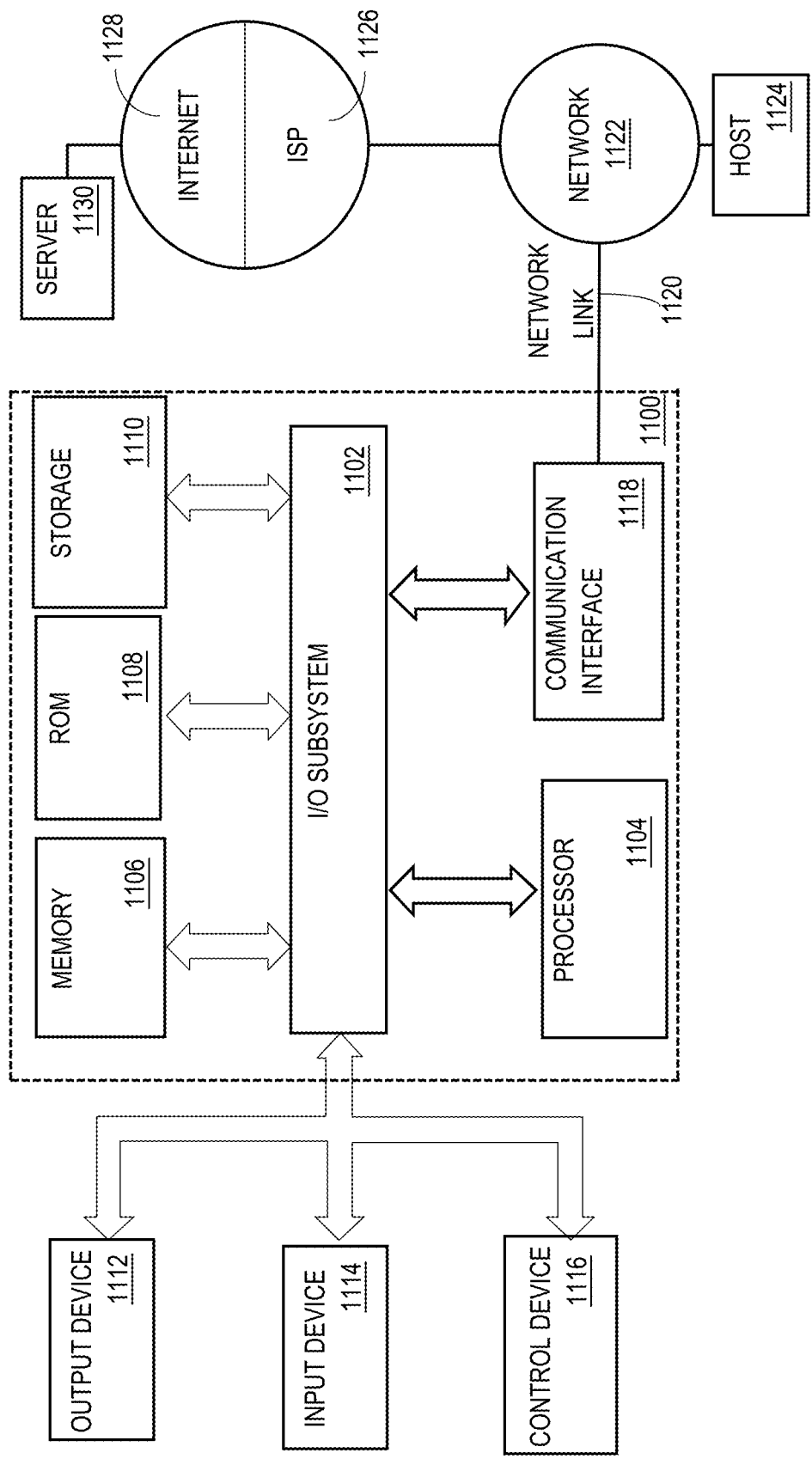
FIG. 11 is a block diagram that illustrates a computer system upon which an embodiment may be implemented.

For example, FIG. 11 is a block diagram that illustrates a computer system 1100 upon which an embodiment may be implemented. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk, optical disk, or solid-state drive is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1110. Volatile media includes dynamic memory, such as main memory 1106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid-state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A structure construction apparatus comprising:
 a plurality of post-tensioning cables;
 a plurality of support devices, each of which comprising
  a cable catch having a plurality of cable holes disposed along a first direction, the plurality of cable holes each having an upper opening and configured to hold one of the plurality of post-tensioning cables in place, a cover that is provided on an upper side of the cable catch and covers the upper opening of each of the cable holes, at least two supports made of steel, extending from a lower side and lateral ends of the cable catch and configured to support the cable catch at a particular height, and a base having an upper side configured to receive the at least two supports extending from the lower side and the lateral ends of the cable catch at different heights, wherein each of the plurality of cable holes is configured to extend in a second direction perpendicular to the first direction such that when the plurality of post-tensioning cables are held in place by the cable holes, the plurality of post-tensioning cables extend in the second direction and in parallel with each other, wherein the at least two supports separately extend from each other from the lower side and the lateral ends of the cable catch, and a line connecting the lateral ends of the cable catch is parallel with the first direction, wherein at least one of the plurality of post-tensioning cables comprises a plurality of labels, each of which comprising data identifying a height of the post-tensioning cable at a location of the label and a unique computer-readable code, and wherein each of the labels further identifies one or more of data about a construction site, a level, a project, a customer, an identification of the at least one of the plurality of post-tensioning cables, or a spacing value indicating a horizontal spacing between elevation support points along the particular post-tensioning cable.

2. The structure construction apparatus of claim 1, wherein each support device of the plurality of support devices further comprises a visual indication of an intended height of the support device.

3. The structure construction apparatus of claim 1, wherein each support device of the plurality of support devices comprises a unique computer-readable code corresponding to the support device which, when scanned by a computing device, causes the computing device to retrieve data about the support device.

4. The structure construction apparatus of claim 1, wherein the computer readable code, when scanned by a computing device, causes the computing device to retrieve information regarding the particular cable corresponding to the computer readable code, compare said information to stored project data, and cause visual display, through a graphical user interface, of identified discrepancies.

* * * * *